US012038500B2

(12) United States Patent
Teague et al.

(10) Patent No.: US 12,038,500 B2
(45) Date of Patent: Jul. 16, 2024

(54) AIRBORNE SENSOR TO SENSOR INFORMATION SHARING TECHNIQUE

(71) Applicant: Rockwell Collins, Inc., Cedar Rapids, IA (US)

(72) Inventors: Jacob G. Teague, West Melbourne, FL (US); Venkata A. Sishtla, Cedar Rapids, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 416 days.

(21) Appl. No.: 17/411,288

(22) Filed: Aug. 25, 2021

(65) Prior Publication Data

US 2023/0066768 A1 Mar. 2, 2023

(51) Int. Cl.
*G01S 13/89* (2006.01)
*B64D 45/00* (2006.01)
(Continued)

(52) U.S. Cl.
CPC .............. *G01S 13/89* (2013.01); *B64D 45/00* (2013.01); *G01S 7/40* (2013.01); *G06T 7/30* (2017.01);
(Continued)

(58) Field of Classification Search
CPC ... G01S 13/89; G01S 7/40; G06T 7/30; G06T 9/00; G06T 2207/10044; B64D 45/00
(Continued)

(56) References Cited

U.S. PATENT DOCUMENTS 3,623,093 A * 11/1971 Bollard ................... G01S 13/87
342/26 B
5,831,570 A * 11/1998 Ammar ................. G01S 13/913
342/149
(Continued)

FOREIGN PATENT DOCUMENTS

AU 2001229343 A1 7/2001
CA 3067604 C * 7/2022 ........... G01S 13/955
(Continued)

OTHER PUBLICATIONS

URL: https://www.govinfo.gov/content/pkg/FR-2015-08-14/html/2015-20053.htm, Notice of Proposed Issuance of Letter of Offer for Purchase of AEGIS Weapon Systems, Federal Register, vol. 80, No. 157, Aug. 14, 2015, 6 pages.
(Continued)

*Primary Examiner* — Nuzhat Pervin
(74) *Attorney, Agent, or Firm* — Suiter Swantz IP

(57) ABSTRACT

A radar system and method for sharing threat data is configured to communicate with other radar systems in surrounding aircraft and share threat specific data. Each radar system may be configured to a specific task according to the priorities of the aircraft and the capabilities of the surrounding aircraft; the gathered data is then shared with the surrounding aircraft such that each aircraft may commit longer dwell time to individual tasks while still receiving data for all of the potential tasks. The radar system may identify a fault and send a request for radar threat data to nearby aircraft. The radar system may receive such data within the operating band of the radar and allow continued operation.

17 Claims, 4 Drawing Sheets

(51) Int. Cl.
*G01S 7/40* (2006.01)
*G06T 7/30* (2017.01)
*G06T 9/00* (2006.01)

(52) U.S. Cl.
CPC ...... *G06T 9/00* (2013.01); *G06T 2207/10044* (2013.01)

(58) Field of Classification Search
USPC .......................................................... 342/59
See application file for complete search history.

(56) References Cited

U.S. PATENT DOCUMENTS

| | | | |
|---|---|---|---|
| 6,501,392 B2 * | 12/2002 | Gremmert | G08G 5/0091 340/945 |
| 6,591,171 B1 * | 7/2003 | Ammar | G01S 13/4427 701/16 |
| 6,828,922 B1 * | 12/2004 | Gremmert | G01S 7/003 342/26 B |
| 6,977,608 B1 * | 12/2005 | Anderson | G01P 13/025 340/963 |
| 6,999,022 B1 * | 2/2006 | Vesel | G01S 13/765 342/29 |
| 7,019,681 B1 * | 3/2006 | Pellett | G01S 7/003 342/13 |
| 7,205,520 B1 * | 4/2007 | Busse | G01S 3/784 250/203.6 |
| 7,230,221 B2 * | 6/2007 | Busse | G01S 5/16 250/203.6 |
| 7,365,675 B2 * | 4/2008 | Pearlman | G01S 13/953 342/26 B |
| 7,626,538 B2 * | 12/2009 | Rose | G01S 3/46 342/107 |
| 7,633,428 B1 * | 12/2009 | McCusker | G01S 7/22 342/26 B |
| 7,868,812 B2 * | 1/2011 | Huthoefer | G01S 13/87 367/87 |
| 7,932,853 B1 * | 4/2011 | Woodell | G01S 13/931 342/36 |
| 8,314,730 B1 * | 11/2012 | Musiak | G01S 13/956 342/25 B |
| 8,330,645 B2 * | 12/2012 | Gurevich | G01S 13/003 342/59 |
| 8,344,933 B1 * | 1/2013 | Kronfeld | G08G 5/0008 342/25 R |
| 8,604,963 B1 * | 12/2013 | Kronfeld | G01S 13/87 342/26 B |
| 8,860,602 B2 * | 10/2014 | Nohara | G01S 7/003 342/195 |
| 9,030,351 B2 * | 5/2015 | Fox | G01S 13/723 342/28 |
| 9,223,020 B1 * | 12/2015 | Crosmer | G01S 7/003 |
| 9,535,158 B1 * | 1/2017 | Breiholz | G01S 7/04 |
| 9,568,602 B1 * | 2/2017 | Stadelmann | G01S 7/03 |
| 9,612,333 B2 * | 4/2017 | Bauman | G08G 5/0008 |
| 9,696,409 B2 * | 7/2017 | Fox | G01S 13/522 |
| 9,869,766 B1 * | 1/2018 | Breiholz | G01S 13/106 |
| 10,044,465 B1 * | 8/2018 | Hetsko | G08G 5/0026 |
| 10,082,561 B2 * | 9/2018 | Wilson-Langman | G01S 13/878 |
| 10,228,460 B1 * | 3/2019 | Jinkins | G01S 7/24 |
| 10,353,068 B1 * | 7/2019 | Jinkins | G01S 13/935 |
| 10,453,351 B2 * | 10/2019 | Choi | G08G 5/04 |
| 10,459,078 B2 * | 10/2019 | Khatwa | G01C 23/005 |
| 10,585,189 B1 * | 3/2020 | Dove | G01S 13/951 |
| 10,705,201 B1 * | 7/2020 | Jinkins | G01S 13/282 |
| 10,809,375 B1 * | 10/2020 | Dana | G01S 13/953 |
| 10,822,110 B2 * | 11/2020 | Colby | G01C 21/3852 |
| 10,955,548 B1 * | 3/2021 | Jinkins | G01S 13/953 |
| 11,156,723 B2 * | 10/2021 | Platzer | G01S 5/0264 |
| 11,181,935 B2 * | 11/2021 | Choi | G01S 13/933 |
| 11,487,016 B2 * | 11/2022 | Sundaramurthy | G08G 5/0082 |
| 11,747,480 B2 * | 9/2023 | Goldstein | G01S 17/04 356/5.01 |
| 2002/0039072 A1 * | 4/2002 | Gremmert | G08G 5/0052 340/963 |
| 2006/0284050 A1 * | 12/2006 | Busse | G01J 1/4228 250/203.1 |
| 2009/0109082 A1 * | 4/2009 | Rose | G01S 13/86 342/73 |
| 2009/0251358 A1 * | 10/2009 | Becker | G01S 7/003 342/120 |
| 2010/0302093 A1 * | 12/2010 | Bunch | H04B 7/18502 342/26 B |
| 2014/0097979 A1 * | 4/2014 | Nohara | G01S 13/87 342/90 |
| 2015/0009061 A1 * | 1/2015 | Lundqvist | G01S 13/04 342/27 |
| 2015/0204973 A1 * | 7/2015 | Nohara | G01S 7/003 342/107 |
| 2015/0348235 A1 * | 12/2015 | Boufounos | G05D 1/104 382/103 |
| 2017/0082745 A1 * | 3/2017 | Kronfeld | G01S 13/953 |
| 2017/0106997 A1 * | 4/2017 | Bekanich | G08B 25/10 |
| 2017/0183104 A1 * | 6/2017 | Colby | G08G 5/0017 |
| 2017/0285137 A1 * | 10/2017 | West | H01Q 25/02 |
| 2018/0031698 A1 * | 2/2018 | Wang | G01S 7/003 |
| 2018/0158342 A1 * | 6/2018 | Gharote | G08G 5/0082 |
| 2018/0164431 A1 * | 6/2018 | Kalyandur | G01S 13/06 |
| 2018/0335504 A1 * | 11/2018 | Nohara | G01S 13/937 |
| 2019/0019423 A1 * | 1/2019 | Choi | G05D 1/0088 |
| 2020/0024012 A1 * | 1/2020 | Fortezza | G01S 19/28 |
| 2020/0082731 A1 * | 3/2020 | Choi | G05D 1/0088 |
| 2020/0142055 A1 * | 5/2020 | Fox | G01S 13/9011 |
| 2020/0266527 A1 * | 8/2020 | Cordone | H01Q 3/26 |
| 2020/0408905 A1 * | 12/2020 | Dubois | G01S 13/723 |
| 2021/0110157 A1 * | 4/2021 | Sinha | G06F 18/251 |
| 2021/0116558 A1 * | 4/2021 | Chan | G08G 3/00 |
| 2021/0132233 A1 * | 5/2021 | Govindillam | G01S 19/12 |
| 2021/0134162 A1 * | 5/2021 | Sundaramurthy | B64D 43/00 |
| 2021/0394932 A1 * | 12/2021 | Galli | G01S 13/87 |
| 2022/0057519 A1 * | 2/2022 | Goldstein | G01S 17/88 |

FOREIGN PATENT DOCUMENTS

| | | | | |
|---|---|---|---|---|
| DK | 2430470 T3 | 10/2018 | | |
| EP | 3371800 B1 | 10/2020 | | |
| EP | 3224648 B1 | 11/2020 | | |
| EP | 3847828 A1 | 7/2021 | | |
| JP | 7205520 B2 * | 1/2023 | ............ | B21D 22/26 |
| RU | 2762151 C2 * | 12/2021 | ........... | G01S 13/867 |

OTHER PUBLICATIONS

Extended European Search Report dated Jan. 24, 2023 on European Application No. 22191987.1 filed Aug. 24, 2022.

* cited by examiner

AIRBORNE SENSOR TO SENSOR INFORMATION SHARING TECHNIQUE

BACKGROUND

Pilots rely on the onboard radar to maneuver around threats, especially for transoceanic flights where the weather radar is part of the minimum equipment list. Even reliable radars can fail; for example, electronically scanned antennas include more electronics compared to flat plate antennas which increases complexity and points of failure. A failed radar decreases the safety of the flight and may necessitate a flight cancelation.

Furthermore, next generation radars will perform multiple functions such as weather detection, detect and avoid, etc. Antenna dwell time is very precious to accomplish all the required functionality. Performance reduction can occur if the necessary antenna time is not allocated to each function. There is a need to coordinate systems in a way to minimize dwell time while offering similar or increased threat detection capability.

SUMMARY

In one aspect, embodiments of the inventive concepts disclosed herein are directed to a radar system and method for sharing threat data. The system communicates with other radar systems in surrounding aircraft and shares threat specific data. Each radar system may be configured to a specific task according to the priorities of the aircraft and the capabilities of the surrounding aircraft; the gathered data is then shared with the surrounding aircraft such that each aircraft may commit longer dwell time to individual tasks while still receiving data for all of the potential tasks.

In a further aspect, the radar system may identify a fault and send a request for radar threat data to nearby aircraft. The radar system may receive such data within the operating band of the radar and allow continued operation.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
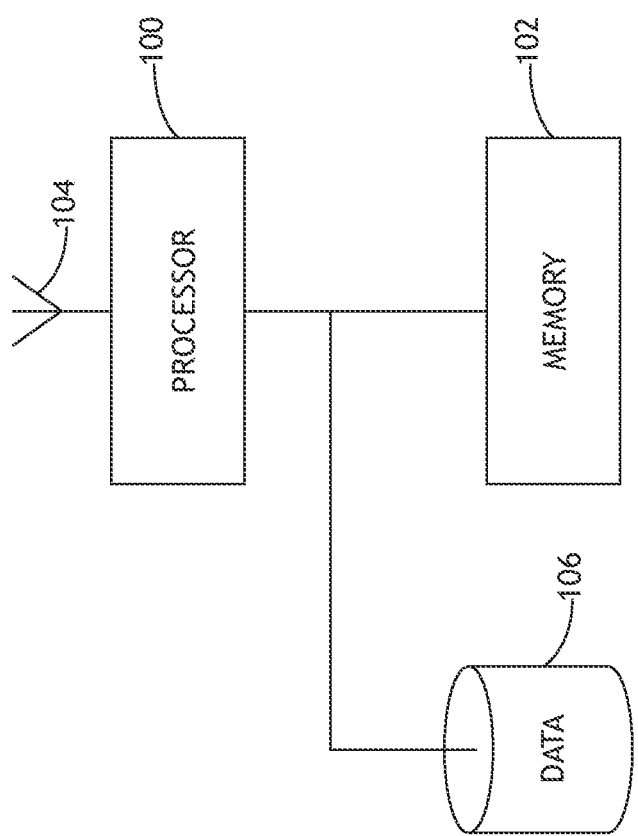
FIG. 1 shows a block diagram of a system for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a radar system and method for sharing threat data. The system communicates with other radar systems in surrounding aircraft and shares threat specific data. Each radar system may be configured to a specific task according to the priorities of the aircraft and the capabilities of the surrounding aircraft; the gathered data is then shared with the surrounding aircraft such that each aircraft may commit longer dwell time to individual tasks while still receiving data for all of the potential tasks. The radar system may identify a fault and send a request for radar threat data to nearby aircraft. The radar system may receive such data within the operating band of the radar and allow continued operation.

Referring to FIG. 1, a block diagram of a system for implementing an exemplary embodiment is shown. The system, installed in an aircraft and potentially embodied in a radar system, includes a processor 100, a memory 102 connected to the processor 100 for embodying processor executable code, and an antenna 104 connected to the processor 100. In at least one embodiment, the antenna 104 comprises an electronically scanned array. Furthermore, the system may comprise non-radar communication systems to establish a datalink with other aircraft.

In at least one embodiment, the processor 100 is configured to apply signals to the antenna 104 to configure the antenna 104 for a particular beamwidth, frequency range, radar task, etc. The processor 100 sends and receives signals via the antenna 104, for example corresponding to radar imaging of a threat. Likewise, other aircraft in the vicinity (sufficiently proximal to gather radar imaging data of the same threat) may also gather radar data from a different location, different frequency, different signal analytical process, etc., for storage in a data storage element 106. The processor 100 sends and receives radar data to and from the other aircraft to produce a singular radar image derived from all of the available data.

In at least one embodiment, the aircraft share data via a datalink established through the radar antenna 104. An X-band datalink through the radar antenna 104 reduces overhead in other communications bands. It may be appreciated the aircraft may comprise a plurality of antennas 104, each configured to operate in different bands such as the X-band and Ka-band. Other frequency diverse antennas may be utilized for information gathering and datalink connectivity between aircraft.

In at least one embodiment, each aircraft may communicate the aircraft's capabilities to other aircraft in the vicinity. The processor 100 may determine, based on the capabilities of neighboring aircraft, how to configured the antenna 104 to maximize data gathered, and the diversity of data gathered, by the set of aircraft in data communication. Alternatively, or in addition, each aircraft may employ a set of priorities, specific to particular aircraft, for deciding how to configure the antenna 104.

Coordinating radar systems on multiple aircraft reduces individual system dwell times. Dwell time reduction improves situational threat awareness and system capability. Time coherent beams from multiple spatial perspectives reduce threat detection time and increase threat data resolution. Coordinating radar parameters such as power, polarization, pulse widths, modulation, etc. enables a diversity of data otherwise difficult or impossible to gather for a single aircraft. In at least one embodiment, radar parameters are embedded into the beam itself so that other aircraft may detect and incorporate the additional information. In at least one embodiment, signal-to-noise thresholding may be used to identify nearby aircraft for coordination.

In at least one embodiment, the processor 100 may identify a failing or faulty antenna 104 for radar imaging during flight. The processor 100 may then communicate with an aircraft in the vicinity and request radar data corresponding to proximal threat events. An x-band datalink between several radars may enable the aircraft with the failing antenna 104 to continue to operate with local radar. The processor 100 may transmit a distress signal which is received by one or more neighboring aircraft radars or a ground-based source. This signal can contain information regarding the aircraft's position in space, attitude, trajectory (flight path), and possibly the airline. Relevant neighboring radars may then establish a secure network and send their detected threat information to the aircraft with the failing antenna 104. In at least one embodiment, the information may be shared between aircraft of a single airline or its partners. Using the received information, the failing radar can stitch together a threat mosaic and present it to the flight deck.

In at least one embodiment, each aircraft radar system may operate automatically to detect faults, establish a datalink with neighboring aircraft, and receive local radar data via the radar antenna 104. Such automatic operation may include configuring an electronically scanned array antenna 104 for steering and communication (as compared to radar imaging).

Figure 2:
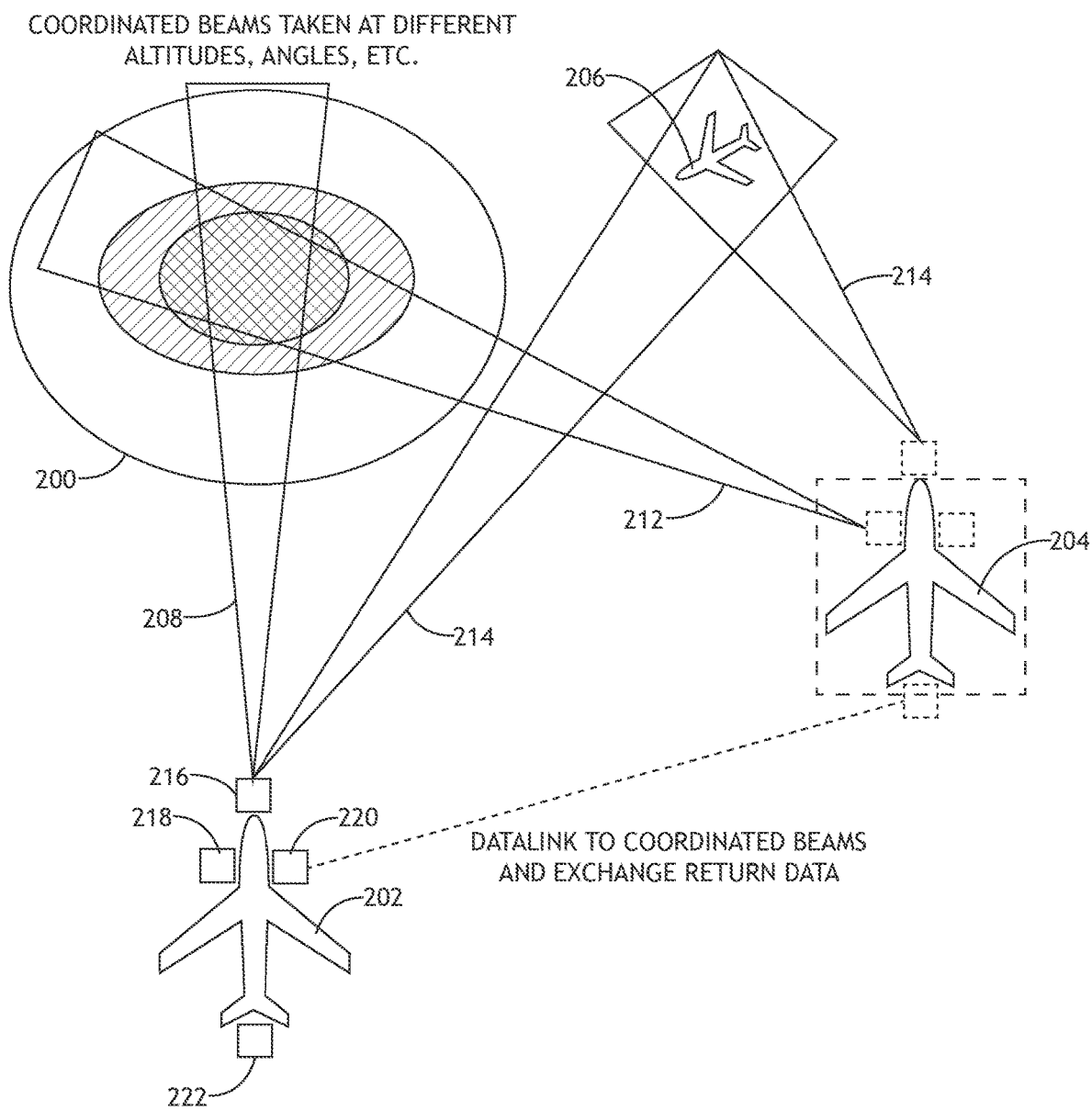
FIG. 2 shows a block representation of aircraft utilizing a system according to an exemplary embodiment.

Referring to FIG. 2, a block representation of aircraft 202 utilizing a system according to an exemplary embodiment is shown. A weather event 200 or other threat may be proximal to a plurality of aircraft 202, 204, 206, each of which may be in data communication with each of the other aircraft 202, 204, 206. Each aircraft 202, 204, 206 may have distinct capabilities defined by the available on-board systems and available antennas 216, 218, 220, 222. Furthermore, each aircraft 202, 204, 206 may have a particular set of priorities; for example, while a first aircraft 202 may be most concerned with a nearby weather event 200 and marginally concerned with a neighboring aircraft 206 further away, a second aircraft 204 may be most concerned with the neighboring aircraft 206 because it is closer and therefore a higher priority threat.

In at least one embodiment, the first aircraft 202 and second aircraft 204 may communicate their respective capabilities and priorities to the other, and establish a data sharing scheme to allow each aircraft 202, 204 increased dwell time on their higher priority target while still receiving radar data corresponding to other local threats.

In at least one embodiment, each of the first aircraft 202 and second aircraft 204 may continue to track each local threat, but also share data corresponding to each threat with the other aircraft 202, 204. Such shared data, taken from a different location and potentially with a different beamwidth or at a different frequency, may by incorporated with locally gathered data to create a higher resolution image of all local threats. Furthermore, each aircraft 202, 204 may organize radar imaging timing between the aircraft 202, 204 such that each aircraft 202, 204 will image a threat in between scans of the other aircraft to effectively double the number of scans over time.

In at least one embodiment, each aircraft 202, 204 may include a plurality of different antennas 216, 218, 220, 222, each configured, including electronically configured, for a different mode of operation. Aircraft 202, 204 in a network of aircraft, each with different radar or imaging capabilities, may share data to produce a more complete threat analysis than any one aircraft 202, 204 is capable of.

In at least one embodiment, each aircraft 202, 204 may transmit data via the radar beam in the X-band to preserve bandwidth.

Figure 3:
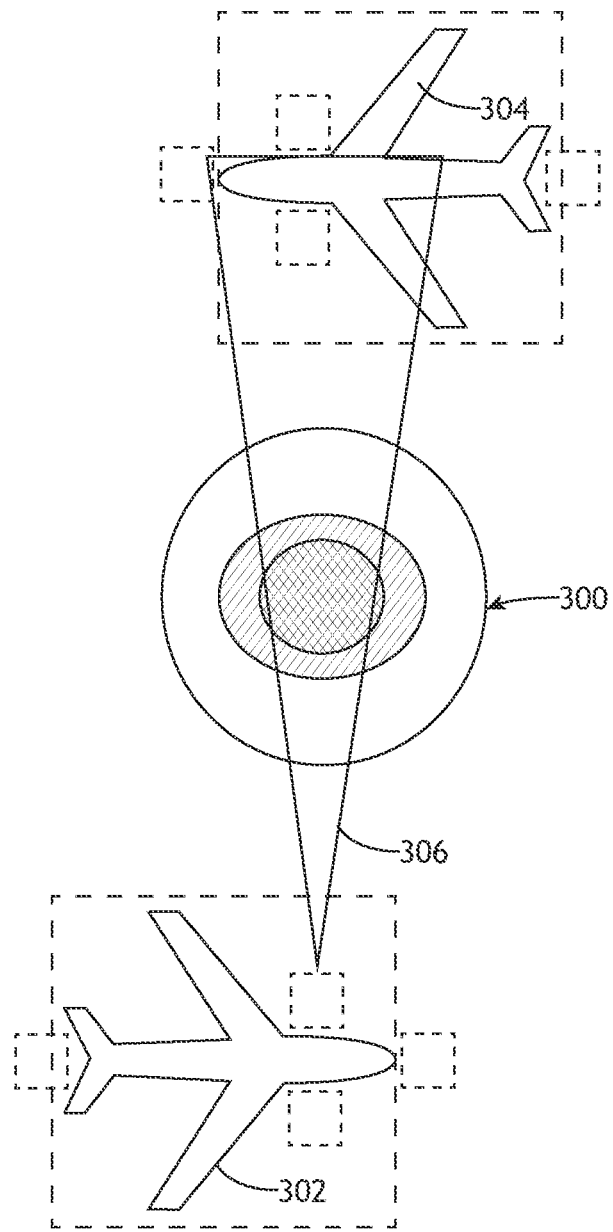
FIG. 3 shows a block representation of aircraft utilizing a system according to an exemplary embodiment.

Referring to FIG. 3, a block representation of aircraft 302, 304 utilizing a system according to an exemplary embodiment is shown. Aircraft 302, 304 utilizing a radar system according to the present disclosure may share radar data with other local aircraft 302, 304 pertaining to local threats 300. In at least one embodiment, a faulty aircraft 304 may identify a fault in its radar system that prevents sufficient imaging of the local threats 300. The faulty aircraft 304 may communicate the fault to a nearby aircraft 302. The nearby aircraft 302 may then establish a datalink connection to the faulty aircraft 304 and transmit radar data to the faulty aircraft 304 so that the faulty aircraft may continue safe operation.

In at least one embodiment, the datalink connection may be via the radar antenna. Radar data may be embedded in the radar beam 306 such that the faulty aircraft 304 may receive and decode the radar information directly from the radar beam.

In at least one embodiment, for example where aircraft 302, 304 are coordinating time or space division data sharing, radar parameters may be encoded directly in the radar beam 306. Radar systems utilizing embodiments of the present disclosure may operate automatically to share radar parameters, establish a division of operations based on capabilities and location, and share the resulting data, all through the radar antenna via an X-band datalink without utilizing bandwidth from other on-board communication systems.

Figure 4:
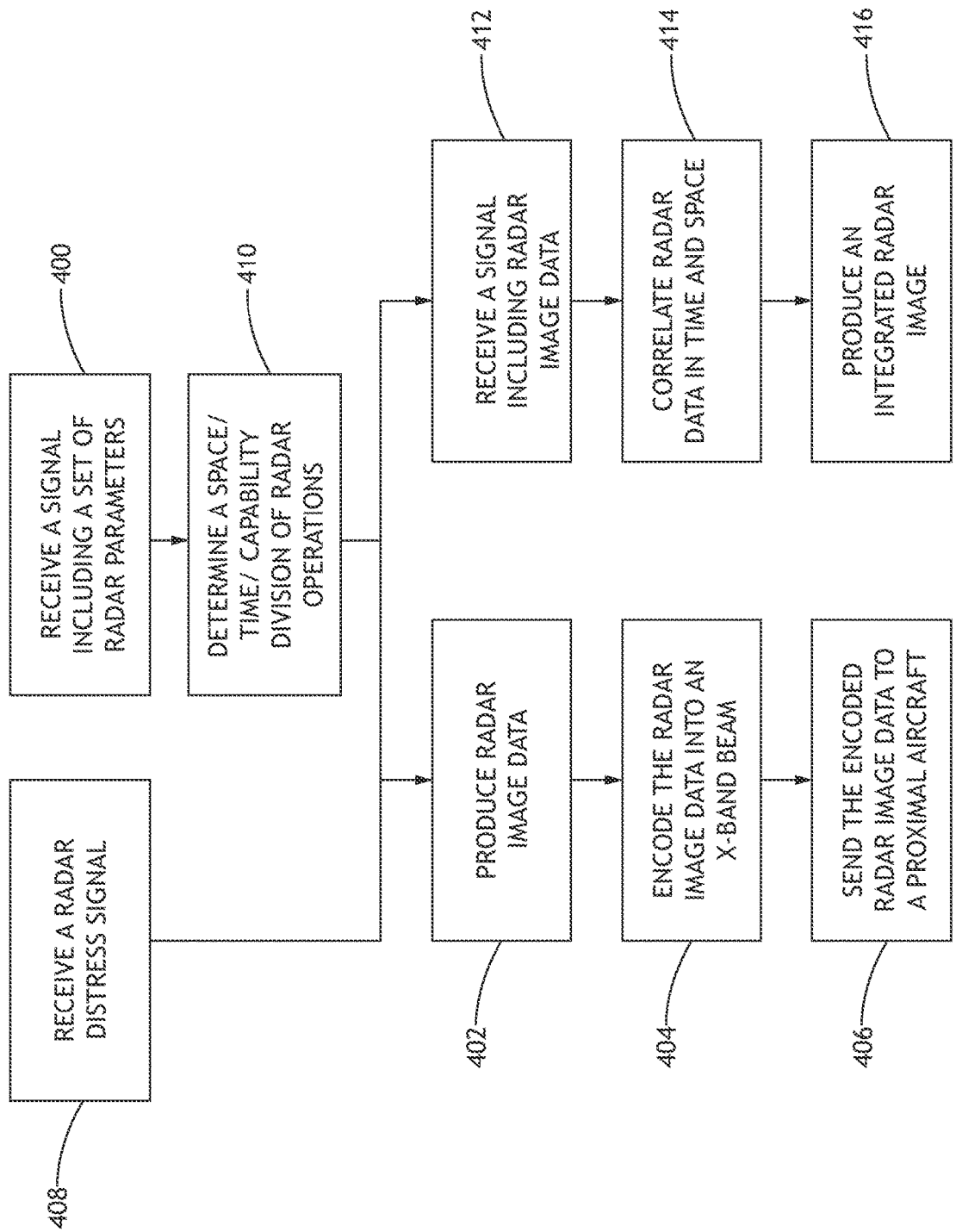
FIG. 4 shows a flowchart of a method according to an exemplary embodiment.

Referring to FIG. 4, a flowchart of a method according to an exemplary embodiment is shown. An aircraft may receive 400 a signal including a set of radar parameters indicating the radar capabilities of a neighboring aircraft. The aircraft may produce 402 radar image data via a radar system, encode 404 the radar image data, and send 406 the encoded radar image data to the neighboring aircraft. Likewise, the aircraft may receive 412 a signal including encoded radar image data, correlate 414 that data with local produced 402 radar image data in time and space, and produce 416 an integrated radar image. In at least one embodiment, the integrated radar image may be encoded into a signal to an alternate neighboring aircraft.

In at least one embodiment, the encoded data may be encoded into an X-band radar signal. Likewise, the signal including radar parameters may be encoded into an X-band radar signal.

In at least one embodiment, the aircraft may receive 408 a radar fault distress signal, potentially encoded into a radar band. The aircraft may then produce 402 radar image data, encode 404 the radar image data, and send 406 it to the aircraft indicating a radar fault without first coordinating data sharing between the aircraft. The encoded radar image data may include information corresponding to the radar parameters used to produce the radar image data, and the location of the aircraft and time of imaging.

Embodiments of the present disclosure enable using an electronically scanned array antenna as a node on a network for sharing and coordinating radar data. Such embodiments may improve hazard acquisition time to enhance situational awareness of the flight crew and improve safety. The network facilitates communication between the aircraft to assign different roles to each aircraft, and then share the resulting data.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
at least one processor in data communication with a memory storing processor executable code for configuring the at least one processor to:
establish a datalink with two or more aircraft;
send a set of local radar capabilities to the two or more aircraft;
receive a set of remote radar capabilities from the two or more aircraft;
determine a division of radar operations among the two or more aircraft to maximize a diversity of data gathered based on the local radar capabilities and remote radar capabilities;
communicate the division of radar operations to the two or more aircraft;
produce radar image data;
encode the radar image data including a set of radar parameters used to produce the radar image data, a location of the computer apparatus, and a time that the radar image data was produced; and
transmit the encoded radar image data to the two or more aircraft.

2. The computer apparatus of claim 1, wherein the radar image data is encoded and transmitted in an X-band radar beam.

3. The computer apparatus of claim 2, wherein the at least one processor is further configured to receive a radar fault distress signal in the X-band.

4. The computer apparatus of claim 1, wherein the at least one processor is further configured to:
receive remote radar image data from the two or more aircraft; and
integrate the radar image data and the remote radar image data into a unified radar image.

5. The computer apparatus of claim 1, wherein the division of radar operations comprises a time division of scans to effectively double a number of scans of a target.

6. The computer apparatus of claim 1, wherein the at least one processor is further configured to:
Receive a set of target priorities from the two or more aircraft; and
bias the division of radar operations according to the set of target priorities.

7. A method comprising:
establishing a datalink with two or more aircraft;
sending a set of local radar capabilities to the two or more aircraft;
receiving a set of remote radar capabilities from the two or more aircraft;
determining a division of radar operations among the one or more aircraft;
communicating the division of radar operations to the two or more aircraft to maximize a diversity of data gathered based on the local radar capabilities and remote radar capabilities;
producing radar image data;
encoding the radar image data including a set of radar parameters used to produce the radar image data, a location of the computer apparatus, and a time that the radar image data was produced; and
transmitting the encoded radar image data to the two or more aircraft.

8. The method of claim 7, further comprising:
identifying a fault in a radar system;
sending a radar fault distress signal including a current location and flight path; and
receiving encoded radar image data from one or more external radar sources corresponding to threat data associated with the current location and flight path.

9. The method of claim 8, further comprising:
orienting a plurality of encoded radar images in the encoded radar image data;
stitching the plurality of encoded radar images into a cohesive radar threat image; and
rendering the cohesive radar threat image as if it were produced by the radar system.

10. The method of claim 7, further comprising:
receiving remote radar image data from the two or more aircraft; and
integrating the radar image data and the remote radar image data into a unified radar image.

11. The method of claim 7, wherein the division of radar operations comprises a time division of scans to effectively double a number of scans of a target.

12. The method of claim 7, further comprising:
Receiving a set of target priorities from the two or more aircraft; and
biasing the division of radar operations according to the set of target priorities.

13. A radar system comprising:
an electronically scanned antenna; and
at least one processor in data communication with the electronically steerable antenna and a memory storing processor executable code for configuring the at least one processor to:
 establish a datalink with two or more aircraft via the electronically scanned antenna;
 send a set of local radar capabilities to the two or more aircraft;
 receive a set of remote radar capabilities from the two or more aircraft;
 determine a division of radar operations among the two or more aircraft;
 communicate the division of radar operations to the two or more aircraft to maximize a diversity of data gathered based on the local radar capabilities and remote radar capabilities;
 produce radar image data via the electronically scanned antenna;
 encode the radar image data including a set of radar parameters used to produce the radar image data, a location of the computer apparatus, and a time that the radar image data was produced; and
 transmit the encoded radar image data to the two or more aircraft via an X-band radar beam.

14. The radar system of claim 13, wherein the at least one processor is further configured to receive a radar fault distress signal in the X-band.

15. The radar system of claim 13, wherein the at least one processor is further configured to:
receive remote radar image data from the two or more aircraft; and
integrate the radar image data and the remote radar image data into a unified radar image.

16. The radar system of claim 13, wherein the division of radar operations comprises a time division of scans to effectively double a number of scans of a target.

17. The radar system of claim 13, wherein the at least one processor is further configured to:
receive a set of target priorities from the two or more aircraft; and
bias the division of radar operations according to the set of target priorities.

* * * * *